J. S. LANG.
SHOCK ABSORBER.
APPLICATION FILED NOV. 29, 1915.
1,269,289.
Patented June 11, 1918.
4 SHEETS—SHEET 4.
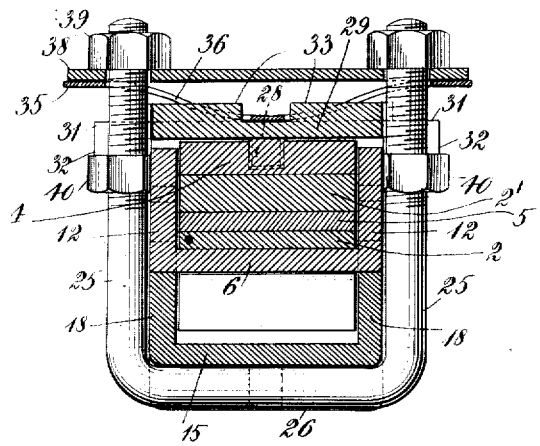
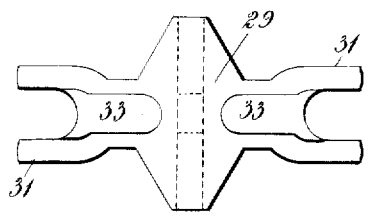
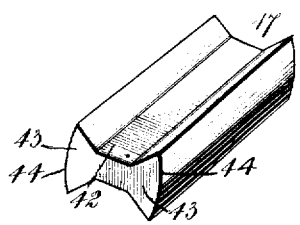
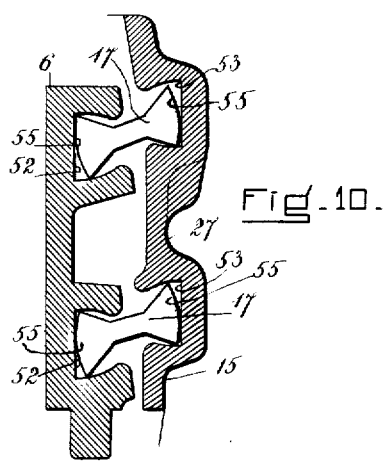
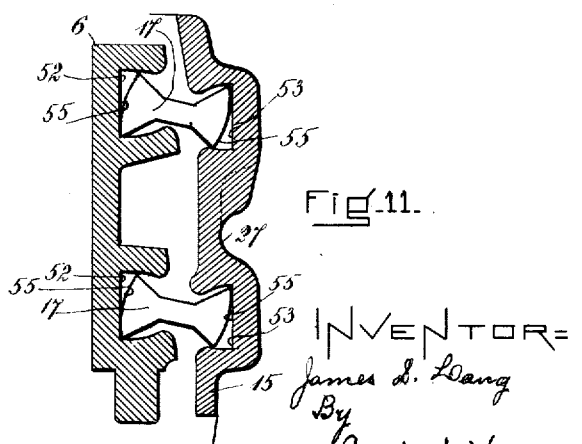

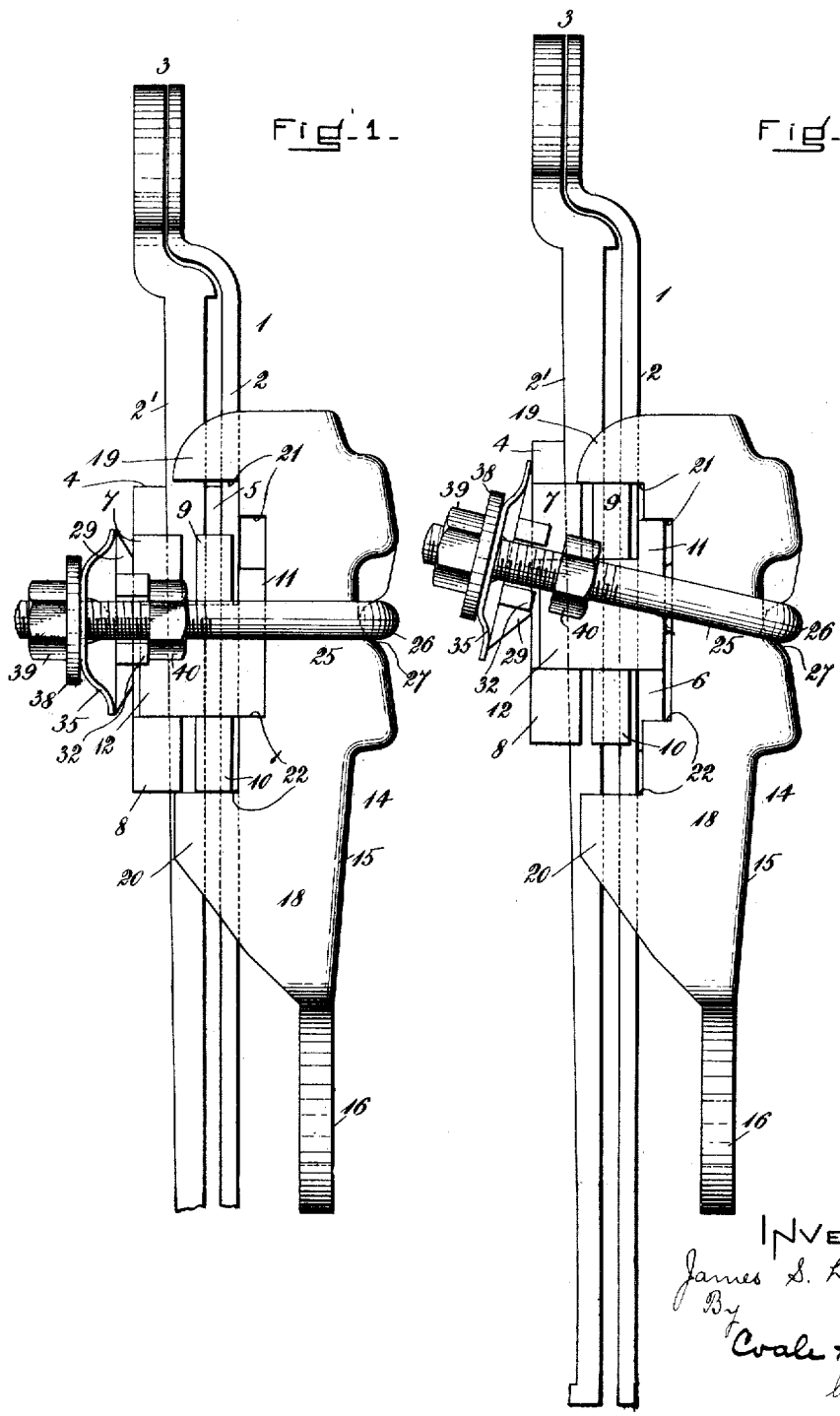

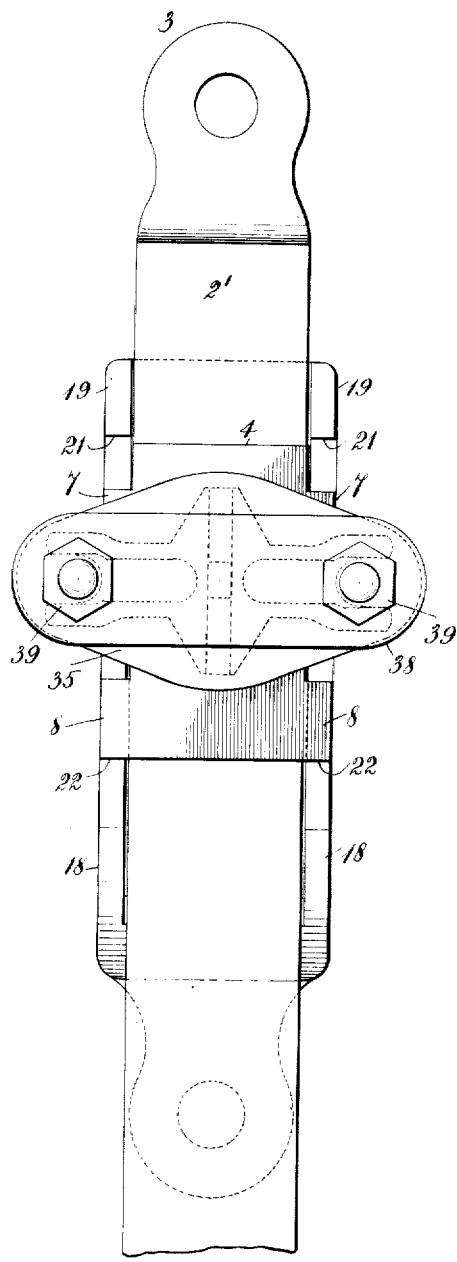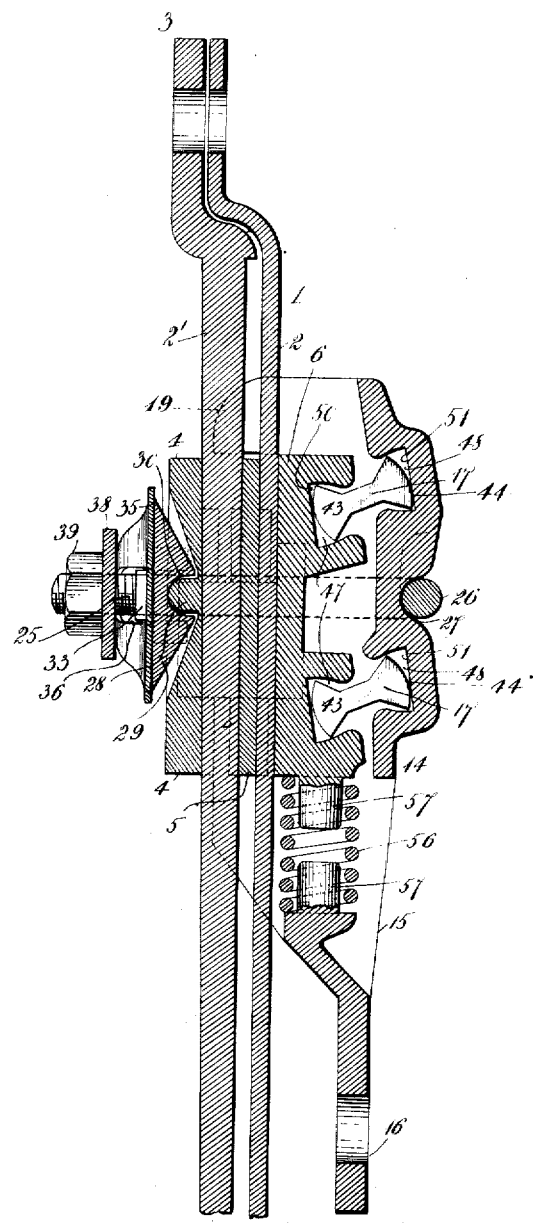

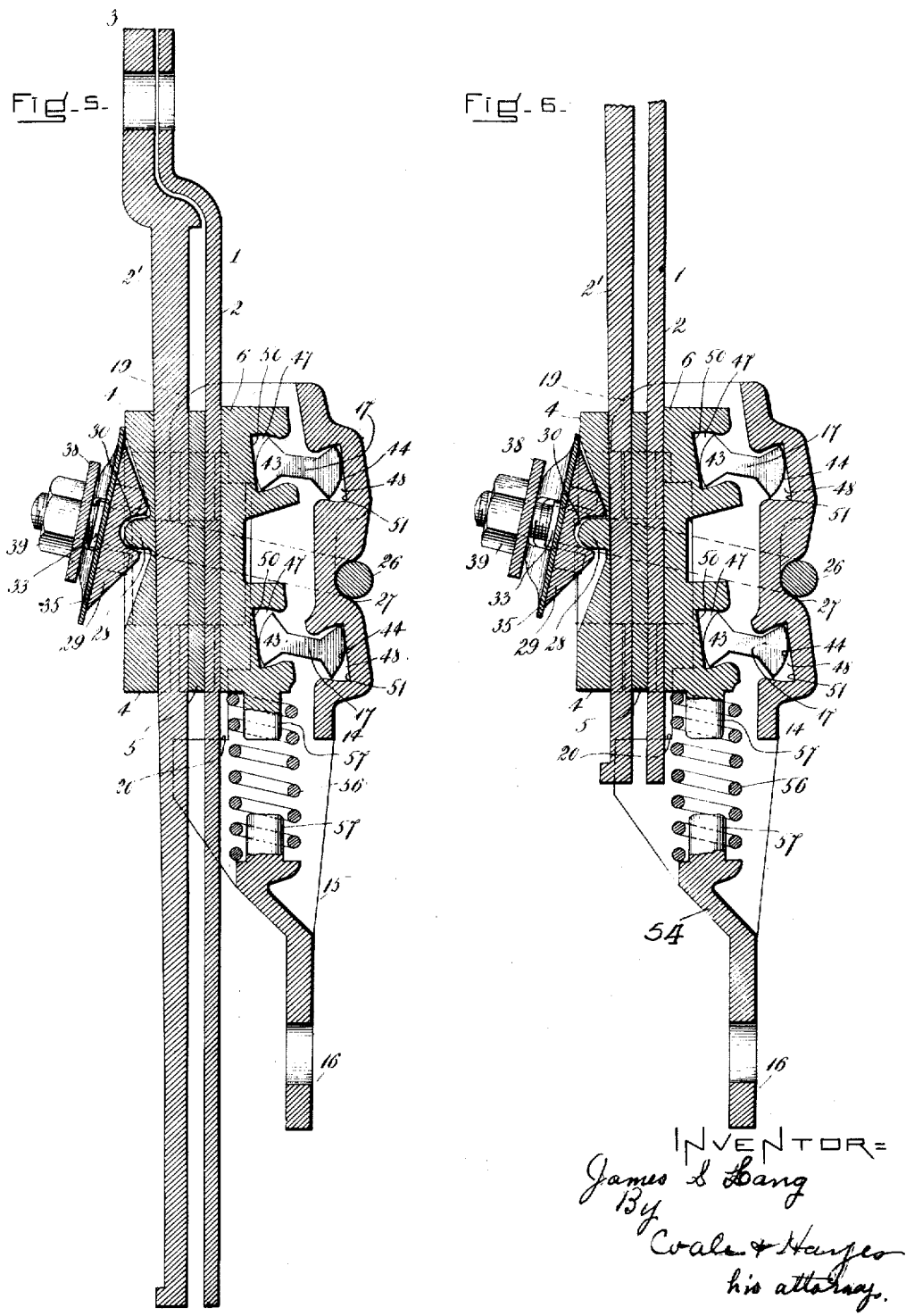

UNITED STATES PATENT OFFICE.

JAMES S. LANG, OF BOSTON, MASSACHUSETTS.

SHOCK-ABSORBER.

1,269,289.   Specification of Letters Patent.   Patented June 11, 1918.

Application filed November 29, 1915. Serial No. 63,945.

*To all whom it may concern:*

Be it known that I, JAMES S. LANG, of Boston, in the county of Suffolk and State of Massachusetts, a citizen of the United States, have invented a new and useful Improvement in Shock-Absorbers, of which the following is a full, clear, and exact description, reference being had to the accompanying drawings, forming a part of this specification, in explaining its nature.

The present invention relates to shock absorbers that are especially designed to be used on automobiles or other vehicles.

Among the objects of my invention is to provide a quick-acting and flexible device which shall be positive in its operation and be properly operative even where but a limited space and range of movement are available.

The shock absorber embodying my invention is of that type which depends for its action upon the frictional engagement or lack of such engagement between certain operating parts consisting in the present instance of a blade or blades and friction shoes engaging the blades.

The manner in which the basic elements of the device are combined and controlled in order to attain the objects above referred to can best be seen and understood by reference to the drawings, in which—

Figure 1 is a side elevation of a shock absorber embodying my invention.

Fig. 2 is a side elevation the same as Fig. 1 excepting that the operating parts are shown in a slightly changed operative position.

Fig. 3 is a front elevation of the device.

Fig. 4 is a longitudinal vertical section of the device as shown in Fig. 1.

Fig. 5 is a longitudinal vertical section of the device as shown in Fig. 2.

Fig. 6 is a longitudinal vertical section substantially the same as Fig. 5 excepting that the basic parts of the blades and friction shoes are in engagement with one another at a point different from that shown in Fig. 5. This figure together with Figs. 4 and 5 are illustrative of the operation of the device as will later be explained.

Fig. 7 is a horizontal cross section of the device.

Figs. 8 and 9 show, respectively, in plan and in side elevation one of the working elements of the device, and Fig. 10 is a view in perspective of another of the working elements of the device.

Fig. 8 is a plan of one of the working elements of the device.

Fig. 9 is a view in perspective of another of the working elements of the device.

Figs. 10 and 11 show, respectively, in section a slightly modified form of construction to which special reference will hereinafter be made.

1 is the friction blade. This is preferably made in two sections 2 and 2'. The sections of the blade have the general form of elongated plates and are made of steel or other suitable material. The blade section 2 has preferably the same uniform thickness throughout its length, while the section 2' is tapered, that is, made with a gradually increasing thickness from its inner toward its outer end. The blade sections are provided each with an outer attachable end 3.

Engaging the blade sections 2 and 2' are friction shoes 4, 5 and 6. Of these shoes the shoe 5 lies between the blade sections and engages the inside faces thereof. The shoes 4 and 6 are arranged outside the sections and engage their outer faces respectively. As will be more fully explained, the blade and shoes are movable relatively to one another and it is the frictional engagement of the shoes with the blade which furnishes the retarding influence upon the vehicle spring with which the device is used. Each of the shoes 4, 5 have bodies of a generally rectangular shape with a width equal to that of the blade. The shoes are associated or nested together in their relationship to one another and to the blade as follows:—

The shoe 4 is provided at either side with spaced flanges 7 and 8 (see Fig. 1). These flanges lap by the side edges of the blade section 2' against which the shoe has bearing. The shoe 5 is provided on either side with similarly spaced flanges 9 and 10 which are extended or widened to lap by the side edges of both the blade sections 2 and 2' between which the shoe lies. The shoe 6 is provided with a flange 11 at either side. These flanges project laterally beyond the sides of the blade section 2 and are provided with right-angularly-disposed offsets 12 which extend by the sides of the blade sections 2 and 2' and the shoes 4 and 5 and between the respective sets of flanges 7, 8, 9, 10 of these shoes (see Fig. 1). Thus associated, the relation of the friction shoes to one another and to the blade is such that the shoes are jointly retained to slide longitudinally in either direction along the blade. The shoes 4 and 6, however, are permitted to have a motion of translation with relation to the faces of the blade by which the intensity of their pressure and that of the shoe 5 against the faces of the blades may be increased or allowed to diminish as will later be explained.

The friction shoes are otherwise supported and retained by a carrier 14 and other parts coöperating with it. The carrier 14 comprises a casing or housing of which 15 represents its body which is provided with an attaching bar extension 16. The body of the carrier is arranged to lie alongside the blade outside the shoe 6 and spaced from it in order to provide for the interposition of the roller bearings 17 to which special reference will later be made. From the body 15 of the carrier there project sides 18. These sides lie in substantially the same planes as those occupied by the flanges on the sides of the friction shoes. The sides 18 extend from the back or body of the carrier to the shoes 6 from which point they extend by the side edges of the friction blade by portions 19 and 20 lying respectively above and below the flanges on the sides of the friction shoes. The extending portions 19 and 20 of the sides 18 present interior edge portions 21 and 22, respectively, which face the flanges on the friction shoes and provide stops with which these flanges have engagement. The edge portions 21 and 22 are separated from one another a distance permitting of the shoes being movable for a limited distance in reverse directions along the blade independently of the carrier, or, vice versa, permitting of the carrier being longitudinally movable with a limited movement independently of the friction shoes, the movement in either case being limited by the engagement of the flanges on the sides of the shoes with the edges 21 and 22 on the sides of the carrier.

Coöperating with the carrier in its retention and control of the friction shoes is a U-shaped strap comprising two threaded arms or bolts 25 and connection 26 between them. The connection 26 lies within a socket 27 formed upon the back of the body of the carrier, the adaptation being such that the connection may turn within this socket and the bolts 25 turn with it upon an axis at substantially right angles to the longitudinal line of the blade. The strap arms 25 extend from their connection 26 by the side 18 of the carrier and thence forward beyond the friction shoes where their projecting ends are retained as follows: The friction shoe 4 is incised upon the rear side thereof to form a central projecting semi-circular bearing 28. Upon this bearing is mounted a saddle having a body 29, the bearing 28 fitting within a socket 30 formed centrally within the body of the saddle. The body of the saddle is made substantially wedge-shaped whereby it may enter the incision on the rear side of the shoe 4 and be enabled to turn freely upon the bearing 28. The body of the saddle is extended outwardly at either side, the extensions therefrom being provided with forked ends 31, each end presenting on its inner side a bearing 32 (see Fig. 7). On its outer side the saddle presents raised rib portions 33 arranged upon either side of the median line of the saddle. The respective threaded ends of the strap arms 25 extend through the forked ends 31 of the saddle. Arranged outside the saddle and bearing against it is a curved spring 35 and bearing in it slots 36 through which the ends of the strap arms also extend. The slots 36 formed in the spring are such that when the spring is in engagement with the saddle the ribs 33 on the outer side of the saddle will enter the slots 36 in the spring, thereby operating to center and otherwise hold the spring in proper relation to the saddle. Arranged outside the spring 35 is a plate forming a keeper 38 through which the ends of the strap arms extend and are secured by nuts 39 arranged upon the threaded ends of the arms and bearing against the keeper. Attention is also directed to the nuts 40 adjustable upon the strap arms 25 to have engagement with the bearings 32 on the inner sides of the forked ends of the saddle for purposes which will later be explained.

As before described, there is interposed between the body 15 of the carrier and the friction shoe 6 roller bearings 17. The general form of these bearings is shown in Fig. 10 where it will be seen that the bearing comprises a body 42 having the form of a plate substantially equal in length to the width of the blade. The side edges of the body of the plate are thickened or widened to form heads 43, each presenting a rounding bearing surface 44. Two of these roller bearings are preferably employed and the heads thereof are contained within sockets 47, 48, the sockets 47 lying on the outer side of the shoe 6 and the sockets 48 on the inner side of the body of the carrier, the respective sets of sockets facing one another. The surfaces 44 of the bearings engage, respectively, the surfaces 50 and 51 of the sockets, the surfaces 50 being upon the shoe 6 and the surfaces 51 upon the body of the carrier, these surfaces forming the bottoms of the sockets. The surfaces 50 and 51 of the sockets are substantially parallel surfaces oppositely arranged but each having a slight angular inclination to the longitudinal line of the blade. In other words, each of the respective sets of surfaces 50 and 51 have a slight outward inclination from the longitudinal line of the blade in the direction of the inner ends thereof. With the surfaces thus inclined, if the friction shoe 6 and carrier be moved relatively to one another on lines substantially parallel with the longitudinal line of the blade, then the space will vary between the surfaces 50 and 51 along a line drawn through these surfaces at substantially right angles to the longitudinal line of the blade, the space being longer when the shoe 6 and body of the carrier are moved to the position shown in Fig. 4 where that portion of the surface 50 nearest the blade is in opposition to that portion of the surface 51 farthest from the line of the blades, and the distance will be shorter when the shoe 6 and carrier are in the position shown in Fig. 5 where the portion of the surface 50 farthest from the line of the blades is in opposition to that portion of the surface 51 nearest the line of the blade.

Each roller bearing 17 is interposed between the sockets 47, 48 with the heads of the bearings contained within the sockets and the rounding surfaces 44 of the heads bearing, respectively, against the surfaces 50, 51 of the sockets. When the shoe 6 (and the other shoes with it) is moved into the position relatively to the carrier shown in Fig. 4, then the surfaces 44 of the roller bearings will engage, respectively, those opposing portions of the respective surfaces 50, 51 which lie farthest apart. When, however, the shoe 6 (and the other shoes with it) is moved into the position relatively to the carrier shown in Fig. 5, then the surfaces 44 of the roller bearing will engage, respectively, those opposing portions of the surfaces 50, 51 of the sockets which lie nearest together. Now the space occupied by the respective bearings when in engagement with any part of the surfaces 50, 51 remains constant owing to the circular form of the bearings, the surfaces 44, in other words, if continued forming a complete circle. The effect is that as the carrier is moved from a position relatively to the shoe 6 (and other shoes with it) as shown in Fig. 4, to the relative position shown in Fig. 5 the roller bearings will operate to gradually separate the back of the carrier from the shoe 6 which has the effect, through the strap which encircles the back of the carrier, to compress the spring 35, which accordingly operates in part, through the roller bearings and their connecting parts, to press the friction shoes against the blade, the pressure increasing gradually and constantly until the carrier and shoes have reached the relative position shown in Fig. 5 as above outlined.

The essential advantage or advantages residing in such an arrangement is as follows: In the first place the angle of thrust of the roller bearings when exerting pressure through the influence of the spring remains substantially constant and this angle is less than the critical friction angle. In other words, the angle between the line of thrust of each bearing and the line normal to the blade is less than the critical friction angle.

By "critical angle" is meant the angle between the line of thrust of the bearing and a line normal to the blade, if the bearing was so inclined to the normal that the force exerted by it would cause the friction shoes to slip along the blade instead of exerting the desired friction grip. According to the construction shown not only is the angle of thrust of the roller bearing substantially constant, but it is also well within the critical angle, eliminating any possibility of slippage.

A further advantage of the construction shown resides in the fact that the pressure exerted upon the shoes becomes gradually and evenly increased from the time when the parts are in the position shown in Fig. 4 to the time when the parts have been moved into the position shown in Fig. 5, a maximum of pressure then being exerted upon the shoes.

In Figs. 10 and 11 there is shown a slight modification of the construction last referred to in that the surfaces 52, 53 of the bottoms of the respective sockets within which the roller bearings are contained, are surfaces substantially parallel with one another and with the longitudinal line of the blades instead of being inclined with relation to the line of the blades as are the surfaces 50, 51 before described, and in place of employing a circular roller bearing there is employed an elliptical roller bearing. In other words, the heads of the roller bearings are formed to present exterior elliptical surfaces 55 which surfaces were they extended to merge with one another would form a complete ellipse.

Owing to its elliptical form, the diameter of the bearing is variable, that is, the diameter along which pressure is being transmitted. When the relative positions of the shoes and carrier are as shown in Fig. 4, then the present bearings will be exerting pressure along the lines of one of their lesser diameters and, as the parts are moved into the position shown in Fig. 5, pressure will be exerted along the lines of diameters of gradually increasing length due to the elliptical form of the bearing, thereby effecting a mode of operation substantially the same as the roller bearing first described.

This type of roller bearing has also the same advantages as before, viz: the angle of thrust of the bearing remains substantially constant and lies well within the critical angle. The pressure exerted by the bearings is a gradual and uniformly increasing pressure, the same as before.

In accordance with the operation of the parts, as will later be referred to, the position of the shoe 6 (and other shoes with it) in relation to the carrier, as shown in Fig. 4, may be referred to as their inoperative position and which is defined by the bearing of the flanges of the friction shoes against the edge 22 of the sides of the carrier; while the relative position of the friction shoe 6 (and other shoes with it) in relation to the carrier, as shown in Fig. 5, may be referred to as their operative position which is defined by the bearing of the flanges of the friction shoes against the top edge 21 of the sides of the carrier.

The friction shoes are maintained in a normally operative position by the interposition of a coiled spring 56 between the under side of the friction shoe 6, or that side facing the inner end of the blade, and that portion 54 of the carrier which lies opposite the same. The spring 56 is held in place by butts 57 formed respectively on the under side of the shoe 6 and the portion 54 of the carrier, these butts entering the coils of the spring and holding it securely in place.

In the application of the present device I prefer that the blades be secured at their inner ends 3 to the spring which connects with the body of the vehicle or to the body of the vehicle directly by any suitable fastening (not shown) and that the attachable bar extension 16 of the carrier for the friction shoes be secured either to the spring which connects with the axle of the vehicle or to the axle directly by any suitable fastening (not shown).

The operation of the device is as follows:—

The normal arrangement of the parts of the device is as shown in Fig. 4 and corresponds with the normal position of the vehicle spring with which the device is associated. It will be seen that the friction shoes at this time are thrown into an operative position with relation to their carrier and the U-shaped strap into an acute angular position with relation to a line normal to the blade. The friction shoes will now have practically no friction grip upon the blade and are movable freely thereon owing to the reduced thickness of the section 2' of the blade and owing, also, to the fact that the tension of the spring 35 is taken off the shoes for the reason that the nuts 40 upon the arms 25 of the strap are in engagement with the bearings 32 on the inner sides of the ends of the saddle. In other words, the adaptation of the parts is such that the saddle with the spring 35 bearing against it will be lifted away from its bearing upon the shoe 4 and rest entirely upon the nuts 40 on the arms of the strap, relieving accordingly the friction shoes from all pressure exerted by the spring 35. The shoes are accordingly in a position to move freely along the blade even though they are occupying an operative position as above defined with relation to their carrier.

Assuming now that the operation of the vehicle to which the spring is attached has tended to compress the vehicle spring: Thereupon the friction blade will move downwardly through the nest of friction shoes. As this action continues a friction grip of the shoes upon the blade will gradually take place owing to the gradual thickening of the section 2' of the blade. A point will at length be reached where the resistance occasioned by the friction grip of the shoes against the blade will overcome the tension of the spring 56. In other words, the blade will move downwardly to a position where it will carry the shoes with it. At such moment the shoes will be moved downwardly into an inoperative position as before defined and all the parts assume a position substantially as shown in Fig. 4 which continues to the end of the movement and full compression of the vehicle spring with which the device is associated. It may be noted, however, that although the shoes are in an inoperative position, yet even under such circumstances the adjustment of the parts is preferably such that the shoes will have some slight friction grip upon the blades owing to the thickening of the section 2' of the blade but not enough to prevent a free and easy compression of the vehicle spring.

Assuming now that the vehicle spring has become fully compressed and the tendency is for the spring to rebound with the usual back lash, which is the difficulty especially to be avoided: As the vehicle spring rebounds the friction blade will be suddenly drawn upward carrying the friction shoes with it owing to the frictional engagement of the shoes with the blade. Thereupon the shoes will be moved into an operative position and the U-shaped strap into its acute angular position. In this connection it may be said that the strap will readily assume its acute angular position owing to the fact that the saddle will pivot or turn upon the bearing 28 of the shoe 4. The parts will now have assumed a position substantially as shown in Fig. 5. The changed position of the roller bearings will have compressed the spring 35 with the resultant effect of forcing the shoes with a very high degree of pressure against the blade which immediately acts as a brake or grip against any tendency of the vehicle spring to back lash. The pressure upon the shoes at this time is occasioned not only by the turned position of the roller bearings but also in no small part by the acute angular position of the U-shaped strap. Although a very sudden and intense pressure is exerted upon the shoes at this time yet there is no possibility of slippage for the reason that the turned position of the roller bearings is well within the critical angle. The application of pressure though sudden is not an impulsive action but a gradual though quick action owing to the nature of the bearings, the pressure gradually reaching a maximum when the friction shoes are brought into their fully operative position as shown in Fig. 5.

As the retraction of the spring continues the friction blade will be drawn out of the nest of shoes. The pressure of the shoes, however, against the blades is gradually becoming less and less as the section 2' of the blade decreases in thickness, the action corresponding relatively with the decreasing reactive force of the vehicle spring until the time when the vehicle spring resumes its normal position and the operative parts of the device their normal positions as above referred to.

Having thus fully described my invention, I claim and desire to secure by Letters Patent of the United States:—

1. In a shock absorber, the combination comprising a friction blade, a friction member in contact with said blade, a carrier for the friction member retained to coöperate with said blade in the support of said friction member and in relation to which said friction member is retained to have a limited endwise movement, a compression member interposed between said friction member and said carrier, said friction and compression members presenting surfaces coöperating with one another whereby said compression member may have a determinate rolling contact with said friction member and simultaneously with the rolling of said compression member said members be displaced laterally in relation to one another, and means whereby said compression member may be retained to have a determinate rolling contact with the surface of said friction member and a lateral displacement of said members be effected upon the endwise displacement of said friction member and said carrier with relation to one another.

2. In a shock absorber, the combination comprising a friction blade, a friction member in contact with said blade, a carrier for the friction member retained to coöperate with said blade in the support of said friction member and in relation to which said friction member is retained to have a limited endwise movement, a compression member interposed between said friction member and said carrier, said carrier and compression member presenting surfaces coöperating with one another whereby said compression member may have a determinate rolling contact with said carrier and simultaneously with the rolling of said compression member said friction member be displaced laterally in relation to said carrier, and means whereby said compression member may be retained to have a determinate rolling contact with the surface of said carrier and a lateral displacement of said friction member be effected upon the endwise displacement of said friction member and said carrier with relation to one another.

3. In a shock absorber, the combination comprising a friction blade, a friction member in contact with said blade, a carrier for the friction member retained to coöperate with said blade in the support of said friction member and in relation to which said friction member is retained to have a limited endwise movement, a compression member interposed between said friction member and said carrier, said friction member and said carrier both presenting surfaces coöperating with surfaces presented by said compression member whereby said compression member may have a determinate rolling contact with both said friction member and said carrier and simultaneously with the rolling of said compression member said friction member be displaced laterally in relation to said carrier, and means whereby said compression member may be retained to have a determinate rolling contact with both said friction member and said carrier and a lateral displacement of said friction member be effected upon the endwise displacement of said friction member and said carrier with relation to one another.

4. In a shock absorber, the combination comprising a friction blade, friction shoes arranged to engage said blade on opposite sides thereof and combined to be movable in unison, a carrier for the shoes with relation to which said shoes are confined to have a limited endwise movement, a strap passed around the back of said carrier and mounted to turn pivotally thereon with arms extending by said blade and shoes on either side thereof, and means for yieldingly retaining under tension and otherwise pivotally supporting the outer ends of said arms.

5. In a shock absorber, the combination comprising a friction blade, friction shoes arranged to engage said blade on opposite sides thereof and combined to be movable in unison, a carrier for the shoes with relation to which said shoes are confined to have a limited endwise movement, bearings interposed between said carrier and one of said shoes, a strap passed around said carrier and mounted to turn thereon with its arms extending by said shoes and blade on either side thereof, and means for yieldingly retaining under tension and otherwise pivotally supporting the outer ends of said arms.

6. In a shock absorber, the combination comprising a friction blade, friction shoes arranged to engage said blade on opposite sides thereof, a carrier for the shoes with relation to which said shoes are retained to have a limited endwise movement, means whereby draft may be exerted laterally upon said carrier and pressure against said shoes upon the lateral displacement of said carrier away from one of said shoes, and means interposed between said carrier and said one of said shoes for changing the spaced relationship of said carrier and shoe upon the endwise displacement of said shoes and carrier with relation to one another.

7. In a shock absorber, the combination comprising a friction blade, friction shoes, a carrier for the shoes with relation to which said shoes are confined to have a limited longitudinal movement, a strap passed around the back of said carrier and mounted to turn pivotally thereon with arms extending by said blade and shoes on either side thereof, and means for yieldingly retaining the outer ends of said arms to exert a tensional draw thereon for exerting pressure against said shoes to have frictional engagement with said blade and comprising in part a member having a pivotal bearing on one of said shoes whereby said strap may turn upon said carrier and the pressure exerted upon said shoes become changed as the position of said shoes is changed in their relation to the carrier.

8. In a shock absorber, the combination comprising a friction blade, friction shoes, a carrier for the shoes with relation to which said shoes are confined to have a limited longitudinal movement, a strap passed around the back of said carrier and mounted to turn pivotally thereon with arms extending by said blade and shoes on either side thereof, and means for yieldingly retaining the outer ends of said arms whereby said strap may turn relatively to said shoes as the position of said shoes becomes changed with relation to the carrier, said means comprising in part a member mounted to turn upon one of said shoes, a spring bearing against said member and other parts retained by the ends of the arms of the strap to have bearing against said spring.

9. In a shock absorber, the combination comprising a friction blade, friction shoes, a carrier for the shoes with relation to which said shoes are confined to have a limited longitudinal movement, a strap passed around the back of said carrier and mounted to turn pivotally thereon with arms extending by said blade and shoes on either side thereof, means for yieldingly retaining the outer ends of said arms, said means consisting in part of a spring, and a saddle against which said spring has bearing and which is mounted to turn upon one of said shoes.

10. In a shock absorber, the combination comprising a friction blade, friction shoes, a carrier for the shoes with relation to which said shoes are confined to have a limited longitudinal movement, means for retaining said carrier to coöperate with said blade in the support of said shoes, said means comprising in part a resilient member by which pressure may be applied to said shoes to frictionally grip said blade, means interposed between said carrier and one of said shoes to change the space relationship of said carrier and shoes as the relative position of said shoe becomes changed longitudinally with relation to said carrier for varying the application of pressure to said shoes, and other means by which the application of pressure exerted by said resilient member may be taken off said shoes.

11. In a shock absorber, the combination comprising a friction blade, friction shoes, a carrier for the shoes with relation to which said shoes are confined to have a limited longitudinal movement, a strap passed around the back of said carrier and mounted to turn pivotally thereon with arms extending by said blade and shoes on either side thereof, means for yieldingly retaining said arms comprising in part a spring by which pressure may be applied to said shoes to frictionally grip said blade, a saddle interposed between said arms of the strap and against which said spring has bearing, said saddle having bearing against one of said shoes, and adjustable members arranged upon said arms to have bearing against said saddle, substantially as described.

12. In a shock absorber, the combination comprising a friction blade, friction shoes arranged to engage said blade on opposite sides thereof, a carrier for the shoes with relation to which and to said blade said shoes are confined to have a limited longitudinal movement, a strap passed around the back of said carrier and mounted to turn pivotally thereon with arms extending by said blade and shoes on either side thereof, means whereby said strap may be yieldingly maintained to exert draft upon said carrier and pressure against said shoes to have frictional engagement with said blade and whereby, also, said strap may turn upon said carrier and the pressure exerted upon said shoes become changed as the position of said shoes is changed longitudinally in their relation to the carrier, and other means assisting in such variance of pressure interposed between the carrier and one of said shoes and coöperating therewith to change the space relationship of the carrier and shoe as the relative position of the shoes becomes changed longitudinally to the carrier as aforesaid.

13. In a shock absorber, the combination comprising a friction blade, friction shoes arranged to engage said blade on opposite sides thereof, a carrier for the shoes with relation to which and to said blade said shoes are confined to have a limited longitudinal movement, a strap passed around the back of said carrier and mounted to turn pivotally thereon with arms extending by said blade and shoes on either side thereof, means whereby said strap may be yieldingly maintained to exert draft upon said carrier and pressure against said shoes to have frictional engagement with said blade and whereby, also, said strap may turn upon said carrier and the pressure exerted upon said shoes become changed as the position of said shoes is changed longitudinally in their relation to the carrier, roller bearings interposed between the carrier and one of said shoes and coöperating therewith to change the space relationship of said carrier and shoe as the relative position of said shoes becomes changed longitudinally with relation to the carrier, and a resilient member interposed between said one of the shoes and the carrier for yieldingly maintaining said shoes and other shoes with it in a normal position in their relation longitudinally to the carrier.

JAMES S. LANG.